United States Patent [19]

Vannatta et al.

[11] Patent Number: 5,463,406

[45] Date of Patent: Oct. 31, 1995

[54] DIVERSITY ANTENNA STRUCTURE HAVING CLOSELY-POSITIONED ANTENNAS

[75] Inventors: Louis J. Vannatta, Crystal Lake; James P. Phillips, Lake in the Hills, both of Ill.

[73] Assignee: Motorola, Schaumburg, Ill.

[21] Appl. No.: 995,113

[22] Filed: Dec. 22, 1992

[51] Int. Cl.[6] .................................................. H01Q 21/00
[52] U.S. Cl. .......................................... 343/725; 343/702
[58] Field of Search .................................. 343/702, 725, 343/729, 794, 895, 700 MS; 455/89, 90, 351, 347

[56] References Cited

U.S. PATENT DOCUMENTS

| | | | |
|---|---|---|---|
| 4,370,657 | 1/1983 | Kaloi | 343/729 |
| 4,575,725 | 3/1986 | Tresselt | 343/700 MS |
| 4,633,519 | 12/1986 | Gotoh et al. | 455/277 |
| 4,827,271 | 5/1989 | Berneking et al. | 343/700 MS |
| 4,868,576 | 9/1989 | Johnson, Jr. | 343/702 |
| 5,185,611 | 2/1993 | Bitter, Jr. | 343/702 |
| 5,245,350 | 9/1993 | Sroka | 343/702 |
| 5,262,791 | 11/1993 | Tsuda et al. | 343/700 MS |
| 5,274,388 | 12/1993 | Ishizaki et al. | 343/725 |

OTHER PUBLICATIONS

Diversity Antennas for Base and Mobile Stations in Land Mobile Communication Systems, Yoshihide Yamada et al., IEICE Transactions, vol. E 74, No. 10, Oct. 1991, pp. 3202–3209.

Small Antennas, by Harold A. Wheeler, IEEE Transactions on Antennas and Propagation, vol. AP-23, No. 4, Jul. 1975, pp. 462–469.

The Radiansphere Around a Small Antenna, Harold A. Wheeler, Proceedings of IRE Aug. 1959, pp. 1325–1331.

*Primary Examiner*—Donald Hajec
*Assistant Examiner*—Tan Ho
*Attorney, Agent, or Firm*—Daniel W. Juffernbruch

[57] ABSTRACT

A diversity antenna structure and a diversity transceiver incorporating the same. Each antenna of the diversity antenna structure is formed of a first portion and a second portion. Second portions of each antenna are coupled to an electrical ground plane and form thereby ground plane portions of the respective antennas. Such second antenna portions are maintained in physical isolation from one another thereby, when receiving high frequency signals, to be maintained in apparent electrical isolation from one another. Because such ground plane portions are maintained in the apparent electrical isolation from one another, antennas of the diversity antenna structure may be positioned in close proximity to one another without causing coupling between the separate antennas of the diversity antenna structure.

19 Claims, 2 Drawing Sheets

100

200

400

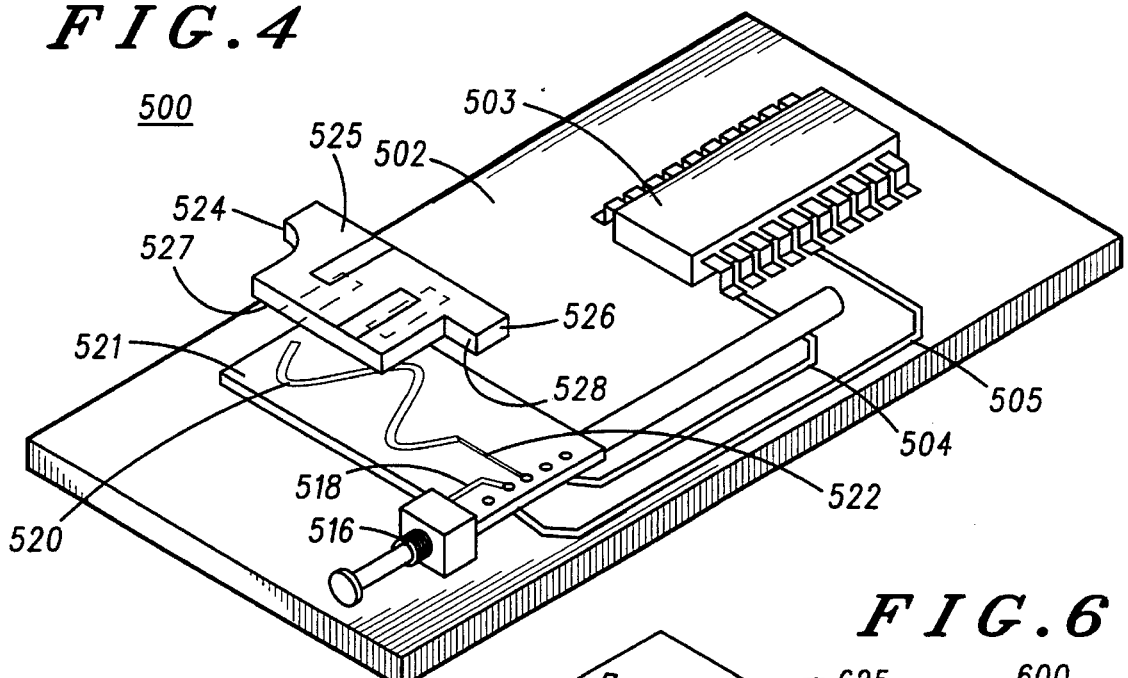
FIG. 4
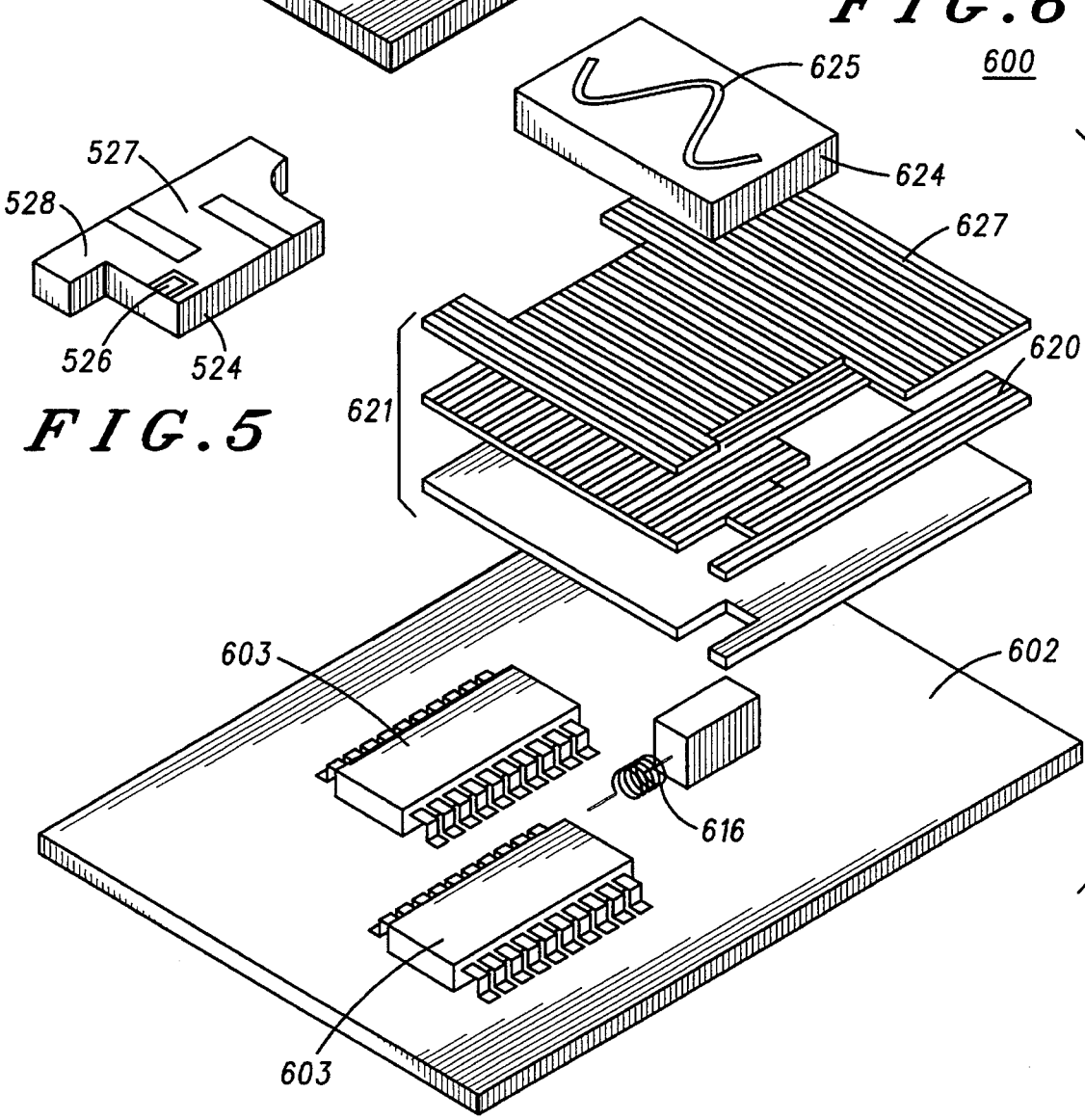
FIG. 5
FIG. 6

DIVERSITY ANTENNA STRUCTURE HAVING CLOSELY-POSITIONED ANTENNAS

TECHNICAL FIELD

The present invention relates generally to diversity antennas and, more particularly, to a diversity antenna structure which permits two antennas configured in a diversity arrangement to be positioned in close proximity to one another.

BACKGROUND OF THE INVENTION

A communication system is comprised, at a minimum, of a transmitter and a receiver interconnected by a communication channel. A communication signal is transmitted by the transmitter upon the transmission channel to be received by the receiver. A radio communication system is a communication system in which the transmission channel comprises a radio frequency channel defined by a range of frequencies of the electromagnetic frequency spectrum. A transmitter operative in a radio communication system must convert the communication signal into a form suitable for transmission upon the radio-frequency channel.

Conversion of the communication signal into a form suitable for transmission upon the radio-frequency channel is effectuated by a process referred to as modulation. In such a process, the communication signal is impressed upon an electromagnetic wave. The electromagnetic wave is commonly referred to as a "carrier signal." The resultant signal, once modulated by the communication signal, is commonly referred to as a modulated carrier signal. The transmitter includes circuitry operative to perform such a modulation process.

Because the modulated carrier signal may be transmitted through free space over large distances, radio communication systems are widely utilized to effectuate communication between a transmitter and a remotely-positioned receiver.

The receiver of the radio communication system which receives the modulated carrier signal contains circuitry analogous to, but operative in a manner reverse with that of, the circuitry of the transmitter and is operative to perform a process referred to as demodulation.

Numerous modulated carrier signals may be simultaneously transmitted upon differing radio frequency channels of the electromagnetic frequency spectrum. Regulatory bodies have divided portions of the electromagnetic frequency spectrum into frequency bands, and have regulated transmission of the modulated carrier signals upon various ones of the frequency bands. (Frequency bands are further divided into channels, and such channels form the radio-frequency channels of a radio communication system.)

A two-way radio communication system is a radio communication system, similar to the radio communication system above-described, but which permits both transmission and reception of a modulated carrier signal from a location and reception at such location of a modulated carrier signal. Each location of such a two-way radio communication system contains both a transmitter and a receiver. The transmitter and the receiver positioned at a single location typically comprise a unit referred to as a radio transceiver, or more simply, a transceiver.

A two-way, radio communication system which permits alternate transmission and reception of modulated carrier signals is referred to as a simplex system. A two-way radio communication system which permits simultaneous transmission and reception of communication signals is referred to as a duplex system.

A cellular communication system is one type of two-way radio communication system in which communication is permitted with a radio transceiver positioned at any location within a geographic area encompassed by the cellular communication system.

A cellular communication system is created by positioning a plurality of fixed-site radio transceivers, referred to as base stations or base sites, at spaced-apart locations throughout a geographic area. The base stations are connected to a conventional, wireline telephonic network. Associated with each base station of the plurality of base stations is a portion of the geographic area encompassed by the cellular communication system. Such portions are referred to as cells. Each of the plurality of cells is defined by one of the base stations of the plurality of base stations, and the plurality of cells together define the coverage area of the cellular communication system.

A radio transceiver, referred to in a cellular communication system as a cellular radiotelephone or, more simply, a cellular phone, positioned at any location within the coverage area of the cellular communication system, is able to communicate with a user of the conventional, wireline, telephonic network by way of a base station. Modulated carrier signals generated by the radiotelephone are transmitted to a base station, and modulated carrier signals generated by the base station are transmitted to the radiotelephone, thereby to effectuate two-way communication therebetween. (A signal received by a base station is then transmitted to a desired location of a conventional, wireline network by conventional telephony techniques. And, signals generated at a location of the wireline network are transmitted to a base station by conventional telephony techniques, thereafter to be transmitted to the radiotelephone by the base station.)

Increased usage of cellular communication systems has resulted, in some instances, in the full utilization of every available transmission channel of the frequency band allocated for cellular radiotelephone communication. As a result, various ideas have been proposed to utilize more efficiently the frequency band allocated for radiotelephone communications. By more efficiently utilizing the frequency band allocated for radiotelephone communication, the transmission capacity of an existing, cellular communication system may be increased.

The transmission capacity of the cellular communication system may be increased by minimizing the modulation spectrum of the modulated signal transmitted by a transmitter to permit thereby a greater number of modulated signals to be transmitted simultaneously. Additionally, by minimizing the amount of time required to transmit a modulated signal, a greater number of modulated signals may be sequentially transmitted.

By converting a communication signal into discrete form prior to transmission thereof, thereby to form a digital code, the resultant modulated signal is typically of a smaller modulation spectrum than a corresponding modulated signal comprised of a communication signal that has not been converted into discrete form. Additionally, when the communication signal is converted into discrete form prior to modulation thereof, the resultant, modulated signal may be transmitted in short bursts, and more than one modulated signal may be transmitted sequentially upon a single transmission channel.

A transmitter which converts the communication signal into discrete form converts the communication signal into a digital code which is modulated and then transmitted upon the communication channel.

While, ideally, the signal received by the receiver is identical with that of the signal transmitted by the transmitter, the signal actually received by the receiver is not a single signal but rather the summation of signals transmitted thereto by differing paths. While one or more shortest-distance paths interconnect the transmitter and the receiver, a multiplicity of other signal paths also interconnect the transmitter and the receiver. For instance, the signal transmitted by the transmitter may be reflected off of both man-made or natural objects prior to reception by the receiver and signals transmitted upon such paths are received by the receiver, delayed in time relative to signals transmitted upon the shortest-distance paths. Because of such multiplicity of transmission paths, an actual communication channel is oftentimes referred to as a multipath channel and the signal received by the receiver is, hence, a summation of the plurality of signals transmitted thereto along the multiplicity of transmission paths. Because signals transmitted along other than the shortest-distance transmission paths arrive at the receiver delayed in time relative to the signal transmitted along the shortest-distance transmission path late-arriving signals interfere with previously-arrived signals. When the signal transmitted by the transmitter comprises the modulated, digital code, such interference is referred to as intersymbol interference. When such intersymbol interference is significant, the signal actually transmitted by the transmitter cannot be recreated by the receiver.

Receivers have been constructed which have two or more spaced-apart antennas for receiving signals transmitted thereto. The signals received at one or the other of the two or more spaced-apart antennas is utilized by circuitry of the receiver to recreate the signal actually transmitted by the transmitter. The antennas are positioned in relative orientations (such as, in a two-antenna configuration, in a mutually-orthogonal orientation) such that when a signal received at one of the antennas includes significant interference or is weak, a signal received at another of the antennas includes, typically, a lesser amount of interference or is of a greater strength. When two or more antennas are configured in such manner, the antennas are referred to as being in diversity (or, diversity antennas), and a receiver including such antennas configured in diversity are referred to as diversity receivers. And, transceivers including such antennas are referred to as diversity transceivers.

When the two or more antennas configured in diversity are spaced-apart from one another by more than one quarter wavelengths of the frequencies of the signals transmitted to the receiver, such antenna configurations work fairly well to overcome the effects of intersymbol interference. However, when the antennas positioned in diversity are positioned in close proximity to one another, coupling between the closely-positioned antennas degrades the antenna performance and, hence, similarly degrades the operability of a receiver incorporating such antennas to recreate a signal actually transmitted thereto by a transmitter.

As radiotelephone constructions utilized in cellular communication systems are constructed to be of increasingly smaller dimensions, antennas positioned in diversity and forming portions of such radiotelephones cannot be positioned apart from one another by the distances greater than the one quarter wavelength distances.

What is needed, therefore, is a diversity antenna structure which permits antennas configured in diversity to be positioned in close proximity to one another without causing significant intercoupling between the antennas.

SUMMARY OF THE INVENTION

The present invention, accordingly, advantageously provides an antenna diversity structure which permits the antennas configured in diversity to be positioned in close proximity to one another.

The present invention further advantageously provides a diversity receiver having diversity antennas configured in close proximity to one another.

The present invention includes further advantages and features, the details of which will become more apparent when reading the detailed description of the preferred embodiments hereinbelow.

In accordance with the present invention, therefore, a diversity antenna structure for a radio having radio circuitry operative in a radio communication system is disclosed. The diversity antenna structure comprises first and second antennas. The first antenna is formed of a first conductive portion and a second conductive portion wherein the second conductive portion of the first antenna forms a first ground plane portion. The second antenna is also formed of a first conductive portion and a second conductive portion. The second conductive portion of the second antenna forms a second ground plane portion wherein the second ground plane portion formed of the second conductive portion of the second antenna is maintained in apparent isolation from the first ground plane portion formed of the second conductive portion of the first antenna.

BRIEF DESCRIPTION OF THE DRAWINGS

The present invention will be better understood when read in light of the accompanying drawings in which:

FIG. 4 is an exploded, perspective view of the diversity antenna structure of the preferred embodiment of FIG. 3 positioned above an electrical circuit board;

FIG. 5 is a perspective view taken from beneath a bottom surface of the patch antenna forming a portion of the diversity antenna structure of the preferred embodiment of the present invention shown in FIGS. 3 and 4; and FIG. 6 is an exploded view of the diversity antenna structure of an alternate, preferred embodiment of the present invention.

DESCRIPTION OF THE PREFERRED EMBODIMENTS

Figure 1:
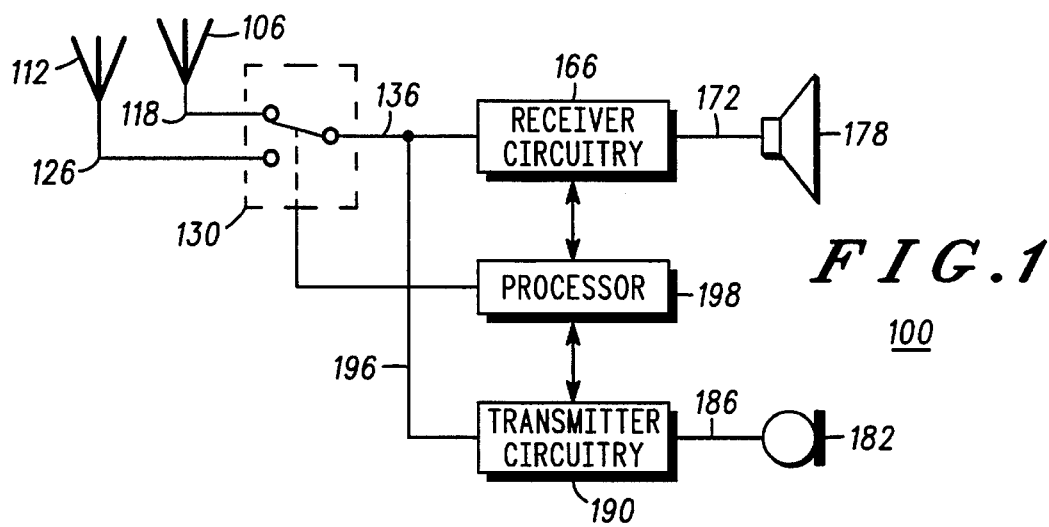
FIG. 1 is a block diagram of a diversity transceiver of a first, preferred embodiment of the present invention.

Referring first to the block diagram of FIG. 1, a diversity transceiver, referred to generally by reference numeral 100, of a preferred embodiment of the present invention is shown. Transceiver 100 is operable both to receive and to transmit modulated signals. Transceiver 100 includes two antennas, here antennas 106 and 112, configured in diversity. (While transceiver 100 includes two antennas configured in diversity, it should be understood that transceiver 100 could similarly include greater numbers of antennas, each configured in diversity.)

When receiving a modulated signal transmitted to transceiver 100, antenna 106 is operative to receive such transmitted signal and to convert such transmitted signal into an electrical signal on line 118. Antenna 112 is similarly operative to receive such transmitted signal and to convert such transmitted signal into an electrical signal on line 126.

Lines 118 and 126 are coupled to switch 130, here shown to be a single-throw, double-pole switch. Switch 130 may, of course, be embodied by an electronic device, such as a multiplexer circuit. Depending upon the switch position of switch 130, either line 118 or line 126 is coupled to line 136, thereby either to supply the signal generated on line 118 or the signal generated on line 126 to receiver circuitry 166. Receiver circuitry 166 is operative, typically, to down-convert in frequency the signal applied thereto, to demodulate the down-converted signal, to decode such demodulated signal, and to supply the decoded signal by way of line 172 to a transducer, here speaker 178.

A transmit portion of transceiver 100 is further shown in the figure and includes a transducer, here microphone 182 which generates an electrical signal on line 186 which is supplied to transmitter circuitry 190. Transmitter circuitry 190 is operative in a manner analogous to, but reverse to that of, receiver circuitry 166 and is operative to generate a modulated signal on line 196 which is coupled to either antenna 106 or antenna 112 by way of switch 130 to permit transmission of a modulated signal therefrom.

Processor 198 further forms a portion of transceiver 100 and is operative to control operation of receiver and transmitter circuitry 166 and 190 as well as to control the switch position of switch 130.

Processor 198 contains appropriate control algorithms embodied therein to determine from which antenna, antenna 106 or antenna 112, that a received signal is to be applied to receiver circuitry 166. In the preferred embodiment of the present invention, such control algorithm is operative to cause positioning of switch 130 to permit sampling by receiver circuitry 166 of signals received by both antennas 106 and 112. Responsive to such sampling, a determination is made as to which of the antennas is to be coupled to receiver circuitry 166.

Figure 2:
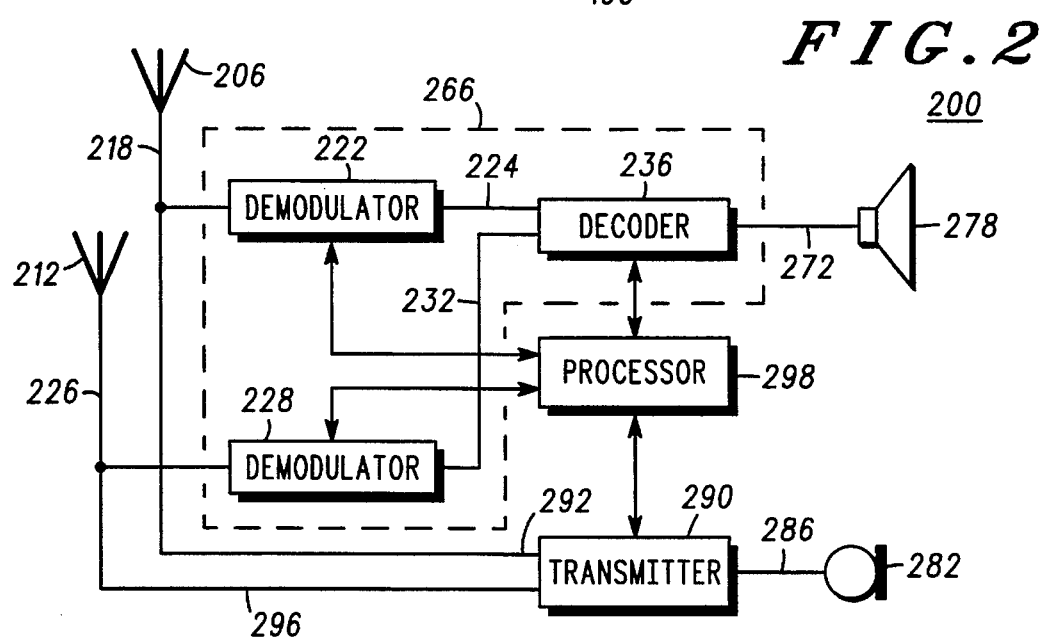
FIG. 2 is a block diagram of a diversity transceiver of an alternate, preferred embodiment of the present invention.

FIG. 2 is a block diagram, also of a diversity transceiver, here referred to generally by reference numeral 200. Diversity transceiver 200 includes circuitry permitting both transmission and reception of modulated signals. Diversity transceiver 200 also includes two antennas, here antennas 206 and 212 positioned in diversity with one another.

When receiving a modulated signal transmitted to diversity transceiver 200, antenna 206 is operative to receive such transmitted signal and to convert such transmitted signal into an electrical signal on line 218. Line 218 is coupled to demodulator circuit 222. Demodulator circuit 222 is operative to demodulate the signal applied thereto and to generate a demodulated signal indicative thereof on line 224.

Similarly, when transceiver 200 is operative to receive a modulated signal, antenna 212 is operative to receive such transmitted signal and to convert such transmitted signal into an electrical signal on line 226. Line 226 is coupled to demodulator circuit 228 which is operative to demodulate and to generate a demodulated signal on line 232.

Lines 224 and 232 are coupled to inputs of decoder 236 which is operative to decode a signal applied thereto. Demodulators 222 and 228 and decoder 236 together comprise receiver circuitry analogous to receiver circuitry 166 of transceiver 100 of FIG. 1. Such receiver circuitry is indicated in the figure by reference numeral 266 which includes the elements contained within the block, shown in hatch.

A decoded signal generated by decoder 236 is generated on line 272 which is applied to a transducer, here speaker 278.

The transmitter portion of diversity transceiver 200 includes a transducer, here microphone 282 which generates an electrical signal on line 286 which is applied to transmitter circuitry 290. Transmitter circuitry 290 is operative in a manner analogous to, but reverse to that of, operation of receiver circuitry 266, and is operative to generate modulated signals alternately on lines 292 and 296 which are coupled to antennas 206 and 212, respectively.

Processor circuitry 298 further forms a portion of diversity transceiver 200. Processor circuitry includes appropriate control algorithms to control operation of component portions of receiver circuitry 266 and transmitter circuitry 290. Such control algorithms embodied therein include algorithms for controlling operation of demodulators 222 and 228. Demodulators 222 and 228 are alternately operative to generate demodulated signals such that demodulated signals generated by only one of the demodulators is supplied to decoder 236 by way of line 224. Operation of one or the other of the demodulators 222 and 228 is determinative of whether signals received at antenna 206 or antenna 212 are applied to decoder 236.

The process of selection from which antenna a received signal is utilized to generate the decoded signal on line 272 is analogous to the process of selection by which the processor circuitry 198 of transceiver 100 makes selection of antennas, and such process shall not again be described. As processor 298 causes operation either of demodulator 222 or demodulator 228, control signals generated by processor circuitry 298 control selection of antenna 206 or 212 in manners analogous to the control signals generated by processor 198 to control the switch position of switch 130 of transceiver 100.

As mentioned hereinabove, when antennas positioned in diversity are spaced-apart by distances at least as great as one quarter wavelengths of the modulated signals transmitted thereto, there is little coupling between such antennas. However, when such antennas are positioned in close proximity to one another, coupling between such antennas degrades antenna performance and also degrades the performance of a receiver incorporating such antennas. Such coupling occurs, at least in part, as the antennas are commonly grounded to a common ground.

Figure 3:
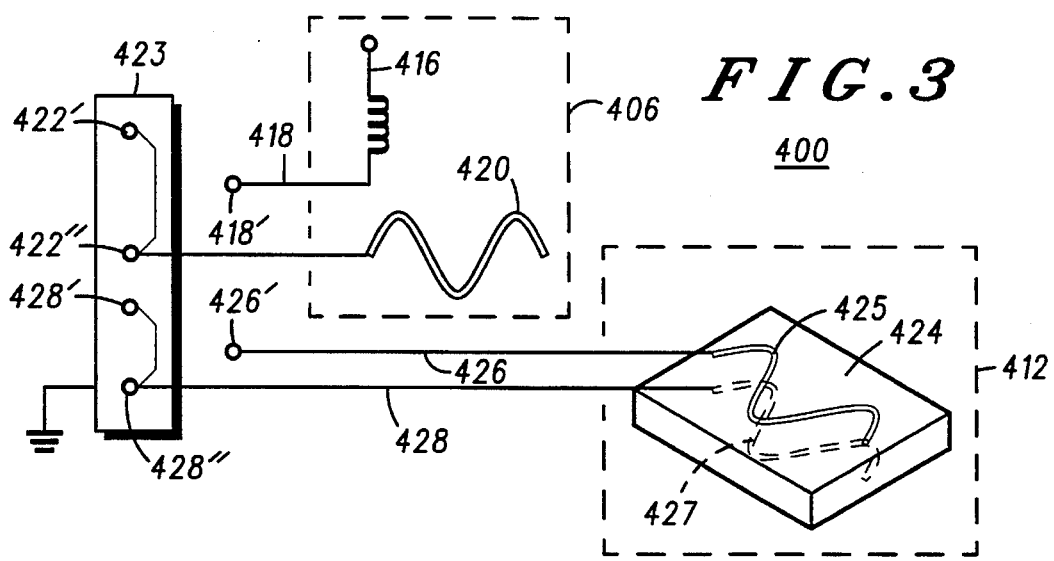
FIG. 3 is a partial perspective, partial circuit schematic diagram of the diversity antenna structure of a preferred embodiment of the present invention.

Turning next to the partial-perspective, partial-electrical schematic diagram of FIG. 3, a diversity antenna structure, referred to generally by reference numeral 400, of a preferred embodiment of the present invention is shown. Antenna structure 400 of FIG. 3 may advantageously form a portion of a diversity transceiver, such as diversity transceivers 100 and 200 of FIGS. 1 and 2, respectively, even when the antennas are positioned in close proximity to one another.

Diversity antenna structure 400 includes first antenna 406, represented in the figure by elements within the block shown in hatch. Diversity antenna structure 400 also includes second antenna 412 similarly represented by the elements within the block shown in hatch. First and second antennas 406 and 412 are analogous to antennas 106 and 112 of diversity transceiver 100 of FIG. I or antennas 206 and 212 of diversity transceiver 200 of FIG. 2.

Antenna 406 is comprised of first antenna portion 416, here illustrated to be a helical, quarter wave antenna coupled to line 418 upon which a signal received by first antenna portion 416 is generated. Line 418 extends to pin member 418'. Pin member 418' facilitates coupling of antenna portion 416 to transceiver circuitry of a diversity transceiver.

First antenna 406 further comprises second antenna portion 420, here shown to be a serpentine-shaped, conductive line. In a preferred embodiment of the present invention, the conductive line comprising second antenna portion 420 is formed of a strip line disposed within an electrical circuit board. Second antenna portion 420 is coupled to an electrical ground plane, here indicated by line 422 coupled to housing 423 which forms the common ground reference node of a portable transceiver, such as a portable, cellular radiotelephone. Line 422 extends to pin members 422' and 422". (While a housing of a portable transceiver is typically comprised of a thermoplastic material, such thermoplastic material typically includes a coating of an electrically-conductive material coated upon inner walls of such housing. Housing 423 in the figure is illustrative of such electrically-conductive coating.)

Second antenna 412 is formed upon opposing face surfaces of substrate 424 comprised of an electrically-nonconductive material. Second antenna 412 comprises first antenna portion 425 formed of a serpentine-shaped conductive line formed upon a top surface of substrate 424, thereby to form a patch antenna. A signal received by first antenna portion 425 is converted into an electrical signal which is generated on line 426 which extends to pin member 426'. Pin member 426' facilitates coupling of antenna portions 425 to transceiver circuitry of a diversity transceiver including such antenna structure.

Second antenna includes second antenna portion 427, also comprised of a serpentine-shaped conductive line but formed on a face surface of substrate 424 opposing that of the face surface upon which first antenna portion 425 is formed. Second antenna portion 427 is electrically coupled to a ground node, represented by housing 423, by way of line 428, and here, more particularly, by way of pin members 428' and 428" to which line 428 extends.

While both second antenna portion 420 of first antenna 406 and second antenna portion 427 of second antenna 412 are both connected to a transceiver ground plane, represented by housing 423, second antenna portions 420 and 427 of first and second antennas 406 and 412 are physically separated from, and properly-oriented to, one another. Such physical separation and orientation causes such two antenna portions 420 and 427 to appear to be in apparent electrical isolation from one another when high frequency signals are received by the antennas 406 and 412. (Such apparent isolation may also be referred to as radio frequency isolation.) It should further be noted that, due to the shapes of the second antenna portions 420 and 427, mutual inductances between antennas 406 and 412 are minimized. Because each individual second antenna portion 420 and 427 is coupled to a transceiver ground plane, such second antenna portions 420 and 427 form ground plane portions of the respective first and second antennas 406 and 412. But because such second antenna portions 420 and 427 are physically separated from one another to be maintained in apparent electrical (or radio frequency) isolation from one another, coupling between the two antennas 406 and 412 is minimal. As a result, first and second antennas 406 and 412 may be positioned in close proximity to one another (i.e., within the aforementioned quarter wavelength distance from one another) while still being separately operable to function in diversity as coupling between the two antennas is minimal.

FIG. 4 is an exploded, perspective view of the diversity antenna structure of FIG. 3, here referred to generally by reference numeral 500 and positioned above an electrical circuit board 502. Transceiver circuitry 503 is mounted upon circuit board 502 and transmission lines 504 and 505 extend therefrom upon a face surface of the circuit board 502.

Analogous to first and second antenna portions 416 and 420 of diversity antenna structure 400 of FIG. 3, diversity antenna structure 500 of FIG. 4 includes a first antenna comprised of first antenna portion 516 formed of a helical, quarter-wave antenna and second antenna portion 520 formed of a strip line disposed within antenna circuit board 521. Line 518 connects first antenna portion 516 to transmission line 505 by way of a pin member (analogous to pin member 418' of FIG. 3) extending through antenna circuit board 521 when antenna circuit board 521 is seated upon circuit board 502. Similarly, second antenna portion 520 is coupled to an electrical ground plane by way of line 522, also by way of a pin member (analogous to pin member 422' and 422" of FIG. 3) extending through circuit board 521 when the circuit board 521 is seated upon circuit board 502.

Substrate 524, analogous to substrate 424 of FIG. 3, is positioned above antenna circuit board 521 and is of dimensions permitting seating thereof upon antenna circuit board 521. Also analogous to first and second antenna portions 425 and 427 of second antenna 412 of FIG. 3, diversity antenna structure 500 includes a first antenna portion 525 and second antenna portion 527 which are disposed upon opposing face surfaces of substrate 524. First antenna portion 525 is formed of a conductive line disposed upon a top face surface of substrate 524, and second antenna portion 527 is disposed upon a bottom face surface of substrate 524. Both conductive lines 525 and 527 are serpentine-shaped conductive lines as defined by two nonconductive post members formed upon the top and bottom face surfaces of the substrate.

Line 526 extends about an edge surface of substrate 524 and leads to a contact pad formed on the bottom face surface of substrate 524, thereby to connect transmission line 525 with the contact pad. The contact pad contacts against an electrically-conductive pad formed upon a face surface of antenna circuit board 521 and thereafter to be electrically-coupled to transmission line 504 by way of a pin member (analogous to pin member 426' of FIG. 3) extending through circuit board 521. Line 528 formed along a bottom surface of substrate 524 permits connection of second antenna portion 527 to an electrical ground.

Because second antenna portion 520 is disposed within antenna circuit board 521 and is physically isolated from second antenna portion 527, the ground planes formed of such antenna portions 520 and 527 are maintained in apparent isolation from one another. Because such antenna portions are maintained in the apparent isolation from one another, coupling between the two antennas (wherein the first antenna is comprised of elements 516–520 and the second antenna is comprised of elements 525–527) is minimal. Accordingly, such antennas may be positioned in close physical proximity to one another, thereby facilitating use of antenna structure 500 to form a portion of a diversity transceiver, such as a portable radiotelephone.

While not shown in the figure, circuit board 521 is preferably a multi-layer circuit board, including, in addition to the strip line comprising conductive line 520, a sheet of electrical-shielding material, such as a sheet of metallic material positioned beneath transmission line 520 and isolated therefrom by a layer of circuit board 521.

FIG. 5 is a perspective view, taken from beneath a bottom surface of substrate 524 of FIG. 4. In the perspective view of FIG. 5, serpentine-shaped conductive line 527, line 526 (which leads to the contact pad formed upon the bottom face surface of substrate 524) and 528 are again shown. When substrate 524 is seated upon a face surface of antenna circuit board 521, lines 526 and 528 permit connection of the first and second antenna portions 525 and 527 to transmission line 505 and an electrical ground plane, respectively.

Turning next to the exploded view of FIG. 6, a diversity antenna structure, referred to generally by reference numeral 600, of an alternate, preferred embodiment of the present invention is shown. Analogous to diversity antenna structure 500 of FIG. 4, diversity antenna structure 600 is of dimensions permitting seating thereof upon electrical circuit board 602 having transceiver circuitry 603 disposed thereupon. In this embodiment, the first antenna is comprised of first antenna portion 616 formed of a helical, quarter wave antenna and a conductive line 620 disposed within antenna circuit board 621 (here shown in exploded form). In this embodiment, while second antenna portion 620 is once again formed of a stripline disposed within an electrical circuit board, second antenna portion 620 is formed of a series of parallel-extending striplines rather than a single serpentine-shaped stripline.

And, analogous to substrate 524 of diversity antenna structure 500 of FIG. 4, diversity antenna structure 600 of FIG. 6 also includes substrate 624 upon which serpentine-shaped transmission line 625 is disposed upon a top face surface thereof. In the embodiment of FIG. 6, the second antenna portion of the second antenna is formed of strips 627 disposed upon a face surface of electrical circuit board 621. The strips 627 are comprised of horizontally-extending, conductive lines formed upon the face surface of the circuit board 621. While not shown, antenna portions 616, 620, 625, and 627 are coupled to transceiver circuitry 603 or an electrical ground plane in manners analogous to the manners in which corresponding elements of diversity antenna structure 500 of FIG. 4 are connected to corresponding circuit portions.

Again, because second antenna portions 620 and 627 are physically isolated from, and properly oriented to, one another (here by way of the nonconductive material of the antenna circuit board) ground plane portions formed of such antenna portions 620 and 627 are thereby maintained in apparent electrical isolation from one another. Because of such apparent electrical isolation, antennas comprised of such antenna portions may be positioned in close physical proximity to one another while not causing coupling between the respective antennas formed therefrom. Accordingly, diversity antenna structure 600 of FIG. 6 may also be advantageously utilized to form the diversity antennas of a diversity transceiver.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A diversity antenna structure for a radio having radio circuitry operative in a radio communication system, said diversity antenna structure comprising:

a first antenna formed of a first conductive portion and a second conductive portion wherein the second conductive portion of said first antenna forms a first ground plane portion; and a second antenna formed of a first conductive portion and a second conductive portion wherein the second conductive portion of said second antenna forms a second ground plane portion and wherein the second ground plane portion formed of the second conductive portion of the second antenna is maintained in isolation from the first ground plane portion formed of the second conductive portion of the first antenna so as to cause radio frequency isolation when a difference between operating frequencies of the first antenna and the second antenna is at least zero.

2. The diversity antenna structure of claim 1 further comprising a first conductive path connecting the first conductive portion of the first antenna with the radio circuitry of the radio.

3. The diversity antenna structure of claim 2 wherein said first conductive path comprises a transmission line.

4. The diversity antenna structure of claim 1 further comprising a second conductive path connecting the first conductive portion of the second antenna with the radio circuitry of the radio.

5. The diversity antenna structure of claim 4 wherein said second conductive path comprises a transmission line.

6. The diversity antenna structure of claim 1 wherein the first conductive portion of said first antenna comprises a helical antenna.

7. The diversity antenna structure of claim 1 wherein said second antenna comprises a patch antenna.

8. The diversity antenna structure of claim 1 wherein said first and second antennas are positioned in mutually-orthogonal orientations.

9. A diversity antenna structure for a radio having radio circuitry operative in a radio communication system, said diversity antenna structure comprising:

a first antenna formed of a first conductive portion and a second conductive portion wherein the second conductive portion of said first antenna forms a first ground plane portion; and a second antenna formed of a first conductive portion and a second conductive portion wherein the second conductive portion of said second antenna forms a second ground plane portion and wherein the second ground plane portion formed of the second conductive portion of the second antenna is maintained in close physical proximity to as well as in isolation from the first ground plane portion formed of the second conductive portion of the first antenna so as to cause radio frequency isolation when a difference between operating frequencies of the first antenna and the second antenna is at least zero;

wherein the second conductive portion of the first antenna is positioned to extend in a first planar direction; and wherein said second conductive portion of the second antenna is positioned to extend in a planar direction substantially parallel to the first planar direction in which the second conductive portion of the first antenna is positioned to extend.

10. The diversity antenna structure of claim 9 wherein said first conductive portion of the second antenna is positioned to extend in a planar direction substantially parallel to the first planar direction in which the second conductive portion of the first antenna is positioned to extend.

11. The diversity antenna structure of claim 10 wherein said second conductive portion of the first antenna is formed along a first substrate.

12. The diversity antenna structure of claim 11 wherein the second conductive portion of the first antenna comprises at least one conductive line disposed within the first substrate.

13. The diversity antenna structure of claim 12 wherein the first and second conductive portions, respectively, of the second antenna are disposed upon opposing sides of a second substrate.

14. The diversity antenna structure of claim 13 wherein the second substrate upon which the first and second conductive portions of the second antenna are formed seats against the first substrate.

15. The diversity antenna structure of claim 12 wherein the second conductive portion of the second antenna comprises a conductive line formed along a face surface of the first substrate.

16. The diversity antenna structure of claim 15 wherein the first conductive portion of the second antenna is disposed upon a side of a second substrate.

17. The diversity antenna structure of claim 16 wherein the second substrate upon which the first conductive portion of the second antenna is disposed seats against the first substrate along a side of the second substrate opposing the side of the second substrate upon which the first conductive portion of the second antenna is disposed.

18. In a radio receiver having receiver circuitry operative in a radio communication system, a combination with the receiver circuitry of a diversity antenna structure, said diversity antenna structure comprising:

a first antenna formed of a first conductive portion and a second conductive portion wherein the second conductive portion of said first antenna forms a first ground plane portion; and a second antenna formed of a first conductive portion and a second conductive portion wherein the second conductive portion of said second antenna forms a second ground plane portion and wherein the second ground plane portion formed of the second conductive portion of the second antenna is maintained in isolation from the first ground plane portion formed of the second conductive portion of the first antenna so as to cause radio frequency isolation when the first antenna and the second antenna operate at same or different frequencies.

19. In a radio transceiver having transceiver circuitry operative in a radio communication system, a combination with the transceiver circuitry of a diversity antenna structure, said diversity antenna structure comprising:

a first antenna formed of a first conductive portion and a second conductive portion wherein the second conductive portion of said first antenna forms a first ground plane portion; and a second antenna formed of a first conductive portion and a second conductive portion wherein the second conductive portion of said second antenna forms a second ground plane portion and wherein the second ground plane portion formed of the second conductive portion of the second antenna is maintained in isolation from the first ground plane portion formed of the second conductive portion of the first antenna so as to cause radio frequency isolation when the first antenna and the second antenna operate at same or different frequencies.

* * * * *